(12) United States Patent
Nilsson et al.

(10) Patent No.: US 11,879,740 B2
(45) Date of Patent: Jan. 23, 2024

(54) METHOD AND SYSTEM FOR UPDATING OF ROUTES WITHIN PARKING AREA

(71) Applicant: Ningbo Geely Automobile Research & Development Co., Ltd., Ningbo (CN)

(72) Inventors: Magnus Nilsson, Floda (SE); Albin Hagström, Lödöse (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 76 days.

(21) Appl. No.: 17/555,418

(22) Filed: Dec. 18, 2021

(65) Prior Publication Data
US 2022/0113144 A1    Apr. 14, 2022

Related U.S. Application Data

(63) Continuation of application No. PCT/CN2020/106572, filed on Aug. 3, 2020.

(30) Foreign Application Priority Data

Aug. 30, 2019   (EP) .................................... 19194562

(51) Int. Cl.
*G01C 21/34* (2006.01)
*G01C 21/36* (2006.01)
*G08G 1/0968* (2006.01)

(52) U.S. Cl.
CPC ..... *G01C 21/3415* (2013.01); *G01C 21/3685* (2013.01); *G08G 1/096811* (2013.01)

(58) Field of Classification Search
CPC ............ G01C 21/3415; G01C 21/3685; G08G 1/096811
See application file for complete search history.

(56) References Cited

U.S. PATENT DOCUMENTS 6,927,700 B1 *   8/2005   Quinn ...................... G08G 1/14
                                                            340/687
8,456,326 B2    6/2013   Sakata
(Continued)

FOREIGN PATENT DOCUMENTS

CN        105427660 A    3/2016
CN        107298095 A    10/2017
(Continued)

OTHER PUBLICATIONS

International Search Report from corresponding International Application No. PCT/CN2020/106572, dated Nov. 9, 2020, 2 pages.
(Continued)

*Primary Examiner* — Luis A Martinez Borrero
(74) *Attorney, Agent, or Firm* — Tucker Ellis LLP (57) ABSTRACT

A method for updating a server route within a parking area. The method includes: registering a parking area route; uploading the registered parking area route to the server; assigning an initial time weight value to the registered parking area route; comparing the registered parking area route with server routes to find a corresponding server route; updating the corresponding server route by applying regression analysis of a distance between the parking area route and the corresponding server route to provide an updated server route; updating a time weight value of the updated server route with the initial time weight value of the registered parking area route; providing the updated server route to a navigation server if the updated time weight value exceeds a threshold time weight value.

15 Claims, 5 Drawing Sheets

(56) References Cited

U.S. PATENT DOCUMENTS

| | | | |
|---|---|---|---|
| 8,890,715 B2* | 11/2014 | Geelen | G01C 21/3685 |
| | | | 340/932.2 |
| 9,418,550 B2* | 8/2016 | Geelen | G01C 21/3685 |
| 9,558,664 B1* | 1/2017 | Gaebler | G08G 1/144 |
| 9,786,169 B2* | 10/2017 | Inoguchi | G08G 1/0962 |
| 10,096,248 B2* | 10/2018 | Penna | G06V 20/58 |
| 10,168,175 B2* | 1/2019 | Geelen | G08G 1/14 |
| 10,636,306 B2* | 4/2020 | Klochikhin | G08G 1/144 |
| 10,713,943 B1* | 7/2020 | Mubarek | G07C 5/008 |
| 10,832,575 B2* | 11/2020 | Khoo | G08G 1/096791 |
| 11,001,254 B2* | 5/2021 | Park | G05D 1/0282 |
| 11,137,256 B2* | 10/2021 | Cunha | G08G 1/14 |
| 11,371,853 B2* | 6/2022 | Kamada | G01C 21/3685 |
| 2006/0267799 A1* | 11/2006 | Mendelson | G08G 1/14 |
| | | | 340/932.2 |
| 2007/0129974 A1* | 6/2007 | Chen | G06Q 10/02 |
| | | | 705/13 |
| 2008/0048885 A1* | 2/2008 | Quinn | G08G 1/0129 |
| | | | 340/932.2 |
| 2008/0082254 A1 | 4/2008 | Huhtala et al. | |
| 2010/0211304 A1* | 8/2010 | Hwang | G01C 21/3484 |
| | | | 701/532 |
| 2011/0140922 A1* | 6/2011 | Levy | G01C 21/3685 |
| | | | 340/932.2 |
| 2013/0268187 A1 | 10/2013 | Scofield et al. | |
| 2015/0241230 A1 | 8/2015 | Davidson | |
| 2016/0364985 A1 | 12/2016 | Penna et al. | |
| 2018/0052860 A1* | 2/2018 | Hayes | H04W 4/029 |
| 2018/0121833 A1* | 5/2018 | Friedman | G06Q 10/0631 |
| 2018/0202816 A1 | 7/2018 | Kesting et al. | |
| 2018/0364063 A1 | 12/2018 | Dorum | |
| 2019/0135275 A1 | 5/2019 | Park | |
| 2019/0331498 A1* | 10/2019 | Kamada | G01C 21/3685 |
| 2020/0003565 A1* | 1/2020 | Cunha | B60W 30/06 |
| 2022/0114893 A1* | 4/2022 | Kim | G06V 10/82 |
| 2022/0335343 A1* | 10/2022 | Rosas-Maxemin | G08G 1/144 |

FOREIGN PATENT DOCUMENTS

| | | | | |
|---|---|---|---|---|
| CN | 107527516 A | | 12/2017 | |
| CN | 108734990 A | | 11/2018 | |
| CN | 109141428 A | * | 1/2019 | G01C 21/16 |
| CN | 109141428 A | | 1/2019 | |

OTHER PUBLICATIONS

Extended European Search Report from corresponding European Application No. 19194562.5 dated Mar. 13, 2020, 10 pages.

* cited by examiner

METHOD AND SYSTEM FOR UPDATING OF ROUTES WITHIN PARKING AREA

RELATED APPLICATION DATA

This application is a continuation of International Patent Application No. PCT/CN2020/106572, filed Aug. 3, 2020, which claims the benefit of European Patent Application No. 19194562.5, filed Aug. 30, 2019, the disclosures of which are incorporated herein by reference in their entireties.

TECHNICAL FIELD

The invention relates to a method for updating a server route within a parking area with a route updating system. The route updating system comprises a registration unit arranged in a vehicle being arranged to register a parking area route of the vehicle within the parking area and being arranged to update server routes within the parking area, a route server comprising a number of server routes within the parking area, wherein each server route comprise at least one server route part.

BACKGROUND

Parking areas outside big malls, stadiums and other larger areas are infrequently mapped by a navigation system such as the Global Positioning System (GPS). Routes within the parking area does thereby not show up as routes in the navigation system when a driver is trying to leave the parking area after having inserted a desired destination. The navigation system will point to where an exit is located, normally the closest one, and the driver must find the way there in the parking area himself/herself.

It is further not certain that the nearest exit indicated in the navigation system is the best one for optimizing the driving time and/or distance. If the navigation systems points towards the nearest exit, an exit further away in the parking area may be better from a total route point of view.

U.S. Pat. No. 8,456,326 B discloses a method in which deviation points from a road is registered and if the vehicle is determined to be parked, the deviation point is registered as an entrance/exit point from a parking area. U.S. Pat. No. 8,456,326 B also discloses that a navigation system can take into account how a vehicle can exit the parking area and thereby direct the vehicle to an exit that may not be the closest one. However, there is no indication as to how the vehicle should get there from inside the parking area.

In addition, if the parking area would change its layout, due to expansion or reconstruction, this is also not reflected in the navigation system and may cause inconvenience for drivers.

SUMMARY

An objective of the disclosure is to provide a method and a system for updating a server route within a parking area. The objective is achieved by a method for updating a server route within a parking area with a route updating system. The route updating system comprises a registration unit arranged in a vehicle being arranged to register a parking area route of the vehicle within the parking area, and a route server comprising a number of server routes within the parking area. Each server route comprises at least one server route part. The route server is arranged to update the server routes within the parking area. The method comprises:

registering a parking area route by the registration unit, wherein the parking area route comprises at least one parking area route part, uploading the registered parking area route to the route server by the registration unit, assigning an initial time weight value to the registered parking area route by the route server, comparing the registered parking area route with server routes to find one existing server route part that corresponds to at least one parking area route part, updating the corresponding existing server route part by applying regression analysis of a distance between each of the parking area route parts and the corresponding existing server route parts to provide an updated server route part of an updated server route, updating a server route time weight value of the updated server route by performing a mathematical operation with a previous server route time weight value and the initial time weight value of the registered parking area route, providing the updated server route to a navigation server if the updated server route time weight value exceeds a threshold time weight value.

Even though most of today's vehicles use a GPS system or similar to collect information and statistics, this has not been fully utilized for parking areas. One advantage with the method according to the disclosure is that it provides mapping of parking areas and guiding within the parking area.

By having a vehicle collecting data in the form of a parking area route by a registration unit, a comparison with existing server routes in a route server can be made. The parking area route is assigned an initial time weight value that is used to indicate when the registration of the parking area route took place. The parking area route is compared to all existing server routes in the route server until a server route is found that has at least a server route part corresponding to a parking area route part.

The distance between the corresponding parking area route parts and server route parts is analyzed by using regression analysis and the result is used to update each server route part to obtain a more accurate location of the actual route. When a large number of such updates are made, a high certainty of where the actual route is can be generated by updating the server route parts with the parking area route parts.

The existing server route, or server route parts if not the entire server route matches with a parking area route, has a server route time weight value indicating the relevance of the server route. The server route time weight value can be used to determine if a server route no longer is in use, for instance due to being obstructed by construction, and should be removed as part of a navigation route in the navigation system.

If the server route time weight value is high enough, the server route will continue to be able to be provided to a navigation server for use in a vehicle navigation system. If not, the server route will not be available for use with the vehicle navigation system and a different route is provided by the navigation system. The method provides a way to obtain complete server routes within the parking area to different locations within the parking area. This is useful if there are a number of stores sharing one larger parking area. The updated server routes can be used to navigate the vehicle to a parking space near e.g. a particular store of interest, to a specific part of a seaport or a specific part of an airport.

The combination of the features:
- comparing the registered parking area route with server routes to find one existing server route part that corresponds to at least one parking area route part,
- updating the corresponding existing server route part by applying regression analysis of a distance between each of the parking area route parts and the corresponding existing server route parts to provide an updated server route part of an updated server route,
- updating a server route time weight value of the updated server route by performing a mathematical operation with a previous server route time weight value and the initial time weight value of the registered parking area route, and
- providing the updated server route to a navigation server if the updated server route time weight value exceeds a threshold time weight value, contribute to making the method efficient in providing continuously refined server routes within a parking area, adding new server routes and removing server routes that are no longer used when conditions within the parking area change.

The method may further comprise:
- determining, by the registration unit, if the registered parking area route comprises an exit position from the parking area,
- comparing the registered exit position with a server route exit position in the route server to find a server route exit position that corresponds to the registered exit position,
- updating the corresponding server route exit position by applying regression analysis of a distance between the registered exit position of the parking area route and the corresponding server route exit position to provide an updated exit position,
- updating a server exit time weight value of the updated server route exit position by performing a mathematical operation with the server exit time weight value and the initial time weight value of the registered parking area route,
- providing the updated server route exit position to a navigation server if the server exit time weight value exceeds a threshold time weight value.

The method may also be used to identify exits from the parking area. In the same way as for updating server routes with registered parking area routes within the parking area, the method can be used to determine if a registered exit position corresponds to a server route exit position. The registered exit position is compared to existing server route exit positions and when a corresponding server route exit position has been found, the server route exit position is updated using regression analysis of the distance between the registered exit position and the server route exit position. The server route exit position has a server exit time weight value that is updated with the initial time weight value of the registered exit position.

If the server exit time weight value is high enough, the server route exit position will continue to be able to be provided to a navigation server for use in a vehicle. If not, the server route exit position will not be available for use with a navigation system and a different exit position is provided to the navigation system. In combination with the updated server routes, this provides a complete route within the parking area to an exit and further. The same advantage as is described above also apply to the server route exit, i.e. the method provides an efficient way to provide continuously refined server route exits within a parking area, adding new server route exits and removing server route exits that are no longer used when conditions within the parking area change.

The method may further comprise:
- determining, by the registration unit, if the registered parking area route comprises an entry position to the parking area,
- comparing the registered entry position with a server route entry position in the route server to find a server route entry position that corresponds to the registered entry position,
- updating the corresponding server route entry position by applying regression analysis of a distance between the registered entry position of the parking area route and the corresponding server route entry position to provide an updated server route entry position,
- updating a server entry time weight value of the updated server route entry position by performing a mathematical operation with the server entry time weight value and the initial time weight value of the registered parking area route,
- providing the updated server route entry position to a navigation server if the server entry time weight value exceeds a threshold time weight value.

The method may also be used to identify entries to the parking area. In the same way as for updating server routes with registered parking area routes within the parking area, the method can be used to determine if a registered entry position corresponds to a server route entry position. The registered entry position is compared to existing server route entry positions and when a corresponding server route entry position has been found, the server route entry position is updated using regression analysis of the distance between the registered entry position and the server route entry position. The server route entry position has a server entry time weight value that is updated with the initial time weight value of the registered entry position.

If the server entry time weight value is high enough, the server route entry position will continue to be able to be provided to a navigation server for use in a vehicle. In combination with the updated server routes, this provides a complete route within the parking area from an entry to a desired position within the parking area. The same advantage as is described above also apply to the server route entry, i.e. the method provides an efficient way to provide continuously refined server route entries within a parking area, adding new server route entries and removing server route entries that are no longer used when conditions within the parking area change.

The method may further comprise:
- registering a plurality of parking area route points, wherein the at least one parking area route part comprises a subset of the plurality of parking area route points,
- registering a travel direction of the vehicle by the registration unit in the vehicle for each parking area route point,
- wherein one parking area route part is created only if the difference in travel direction of at least three consecutive parking area route points lie within a travel direction angle threshold.

By registering parking area route points, a parking area route part can be constructed from at least three consecutive parking area route points where the travel direction of at least three consecutive parking area route points lie within a travel direction angle threshold. This ensures that a parking area route part does not contain both a forward and reverse travel direction, which can happen for instance during parking of a vehicle. The accuracy of the parking area route and thereby the server route is thus increased.

The method may further comprise:
- assigning a decay function time weight value to the server route, where the decay function time weight value is reduced with an expected constant reduction rate of the server route time weight value based on the time passed since last update of the server route,
- reducing the server route time weight value according to a reduction function in the route server, where the reduction function reduces the server route time weight value based on the time passed since last update of the server route,
- comparing the decay function time weight value with the server route time weight value,
- keeping the server route in the route server for a predetermined time if the decay function time weight value is equal to zero and the server route time weight value is greater than zero, and
- removing the server route from the route server if the decay function time weight value equals zero and the server route time weight value equals zero.

As the method can be used for determining if a route within a parking area no longer should be provided to a navigation server, a decay time function can be assigned to each server route. The decay time function can have different parameters depending on to which parking area the server route relates. A large parking area requires a decay time function that reduces its value more quickly than a decay time function would for a smaller parking area. The decay time function initially has the same starting decay function time weight value as the server route time weight value and is reduced by an expected constant reduction in server route time weight value based on the time passed since last update of the server route.

The server route time weight value is at the same time reduced by a reduction function, where the reduction function reduces the server route time weight value based on the time passed since last update of the server route. This reduction of the server route time weight value is a measure of if the server route is used less frequently than expected and is not constant.

When the decay time function is reduced to zero, a check is made to see if also the server route time weight value is zero, i.e. if the server route time weight value has been reduced at the same pace as the decay time function. If the decay function time weight value and the server route time weight value are both zero, this would indicate that the server route is no longer used and it will be removed from the route server. If the decay function is zero, but the server route time weight value is greater than zero, this indicates that the server route has been updated and it is therefore kept in the route server.

The method may further comprise:
- connecting the updated server route inside the parking area with existing route server routes outside the parking area by the updated server route exit positions and/or server route entry positions in the route server before providing the updated server route to the navigation system.

This provides a way to obtain a complete route from within the parking area to a destination outside the parking area and vice versa.

The method may further comprise:
- determining the extension of the parking area by means of a geographic information system (GIS), or by a triangulation method.

Today, parking areas may expand as business expands. The extension of the parking area can therefore be determined dynamically to always have the extension of the parking area up to date so that new parking area routes can be registered and server routes within the expanded part of the parking area be created and updated. Examples of commercial GIS software capable of calculating area from GIS data are ArcGIS (Esri), ERDAS IMAGINE (ERDAS Inc.), MapInfo (Pitney Bowes), SmallWorld (General Electric). Several open source softwares are also available. One example of area calculation by triangulation can be found at The Constructor webpage:

(https://theconstructor.org/surveying/triangulation-surveying/11218/).

The method may further comprise:
- determining if the parking area comprises one-way routes based on the travel direction of each registered parking area route part used to update the server route.

Sometimes obstacles, permanent or temporary, can be placed inside the parking area. The use of the travel direction in each parking area route part and/or parking area route point can be used to determine if a parking area route has become a one-way route.

The objective is further achieved by a route updating system for updating a server route within a parking area. The system comprises a registration unit arranged in a vehicle being arranged to register a parking area route of the vehicle within the parking area, and a route server comprising a number of server routes within the parking area and being arranged to update the server routes. Each server route comprises at least one server route part. The registration unit is configured to register a parking area route, wherein the parking area route comprises at least one parking area route part. The registration unit is further arranged to upload the registered parking area route to the route server. The route server is configured to assign a initial time weight value to the registered parking area route by the route server, compare the registered parking area route with the server routes to find one existing server route part that corresponds to at least a registered parking area route part, update the corresponding existing server route part by applying regression analysis of a distance between each of the parking area route parts and the existing server route parts to provide an updated server route part of an updated server route, update a server route time weight value of the updated server route by performing a mathematical operation with the server route time weight value and the initial time weight value of the registered parking area route, provide the updated server route to a navigation server if the server route time weight value exceeds a threshold time weight value.

The advantages with the route updating system are the same as for the method.

The registration unit may further be configured to determine if the registered parking area route comprises an exit position from the parking area, and the route server is further configured to compare the registered exit position with server route exit positions in the route server to find one server route exit position that corresponds to the registered exit position, update a server exit time weight value of the updated exit position by performing a mathematical operation with the server route time weight value and the initial time weight value of the registered parking area route and provide the updated server route exit position to a navigation server if the server exit time weight value exceeds a threshold time weight value.

The registration unit may further be configured to determine if the registered parking area route comprises an entry position to the parking area, and the route server is further configured to compare the registered entry position with server route entry positions in the route server to find one server route entry position that corresponds to the registered entry position, update a server entry time weight value of the updated server route entry position by performing a mathematical operation with the server route time weight value and the initial time weight value of the registered parking area route and provide the updated server route entry position to a navigation server if the server entry time weight value exceeds a threshold time weight value.

The registration unit may further be configured to register parking area route points, wherein the at least one parking area route part comprises a subset of the plurality of parking area route points, and to register a travel direction of the vehicle for each parking area route point, wherein the parking area route part is created if the difference in travel direction of at least three consecutive parking area route points lie within a travel direction angle threshold.

The route server may further be configured to assign a decay function time weight value to the server route, where the decay function time weight value corresponds to an expected reduction in server route time weight value based on the time passed since the last update of the server route, reduce the server route time weight value according to a reduction function, where the reduction function reduces the server route time weight value based on the time passed since the last update of the server route, compare the decay function time weight value with the server route time weight value, keep the server route in the route server for a predetermined time if the decay function time weight value is equal to zero and the server route time weight value is greater than zero, and remove the server route from the route server if the decay function time weight value equals zero and the server route time weight value equals zero.

The route server may further be configured to connect the updated server route inside the parking area with existing server routes outside the parking area by the updated server route exit positions and/or server route entry positions in the route server before providing the updated server route to the navigation system.

The invention further relates to a computer program configured to cause execution of the method according to the above description.

BRIEF DESCRIPTION OF THE DRAWINGS

FIG. 2 schematically shows a flowchart over the method according to the disclosure, FIG. 3 schematically shows updating a server route part with the registered parking area route points of a registered parking area route part, FIG. 4 schematically shows the creation of a registered parking area route part.

DETAILED DESCRIPTION

Definitions

Parking area: In the context of the application, the term parking area is to be interpreted as any enclosed/delimited area that is unmapped by navigational software and that has a limited number of exit/entry points with roads, waterways or airways connected to them. Non-limiting examples include business parks, university campuses, seaports and airports. More examples could be remote locations such as Safari parks, national parks and/or private estates such as farms/ranches.

Vehicle: In the context of the application, a vehicle is a machine that transports people or cargo and that can be equipped with a registration unit. Vehicles may include motorcycles, cars, flying cars, trucks, buses, ships, boats, airplanes, helicopters.

Server route: A route on a route server that is available to be called on from a navigation server or navigation system in a vehicle to create a route that a driver can follow to a specific destination. The server route may comprise server route exit positions and/or server route entry positions. A server route is constructed of at least one registered parking area route uploaded to the route server.

Registration unit: A unit arranged in a vehicle that is capable of registering vehicle data and that can communicate with at least a route server. Vehicle data can for instance be position, speed and travel direction.

Route server: A server comprising a number of server routes. Can be the same as a navigation server, but can also be separate from a navigation server.

Navigation server: A server comprising routes that can be called on from a navigation system in a vehicle to create a route that a driver can follow to a specific destination.

Parking area route: A route in a parking area registered by the registration unit of a vehicle during driving in the parking area. The parking area route can comprise exit positions and/or entry positions from/to the parking area.

Initial time weight value: A value assigned to a registered parking area route by the route server. The value is determined by the size of the parking area and/or the expected traffic in the parking area.

Server route time weight value: A value assigned to a server route indicating the server routes relevance.

Threshold time weight value: A value in the route server that needs to be exceeded by a server route time weight value for an updated server route for the updated server route to be added to the route server.

Decay function: A function in the route server that from an initial decay function time weight value reduces at a constant reduction rate.

Reduction function: A function in the route server that from an initial server route time weight value reduces the server route time weight value at a varying reduction rate.

Mathematical operation: With a mathematical operation is meant for instance addition, subtraction, division, multiplication and exponentiation.

Figure 1:
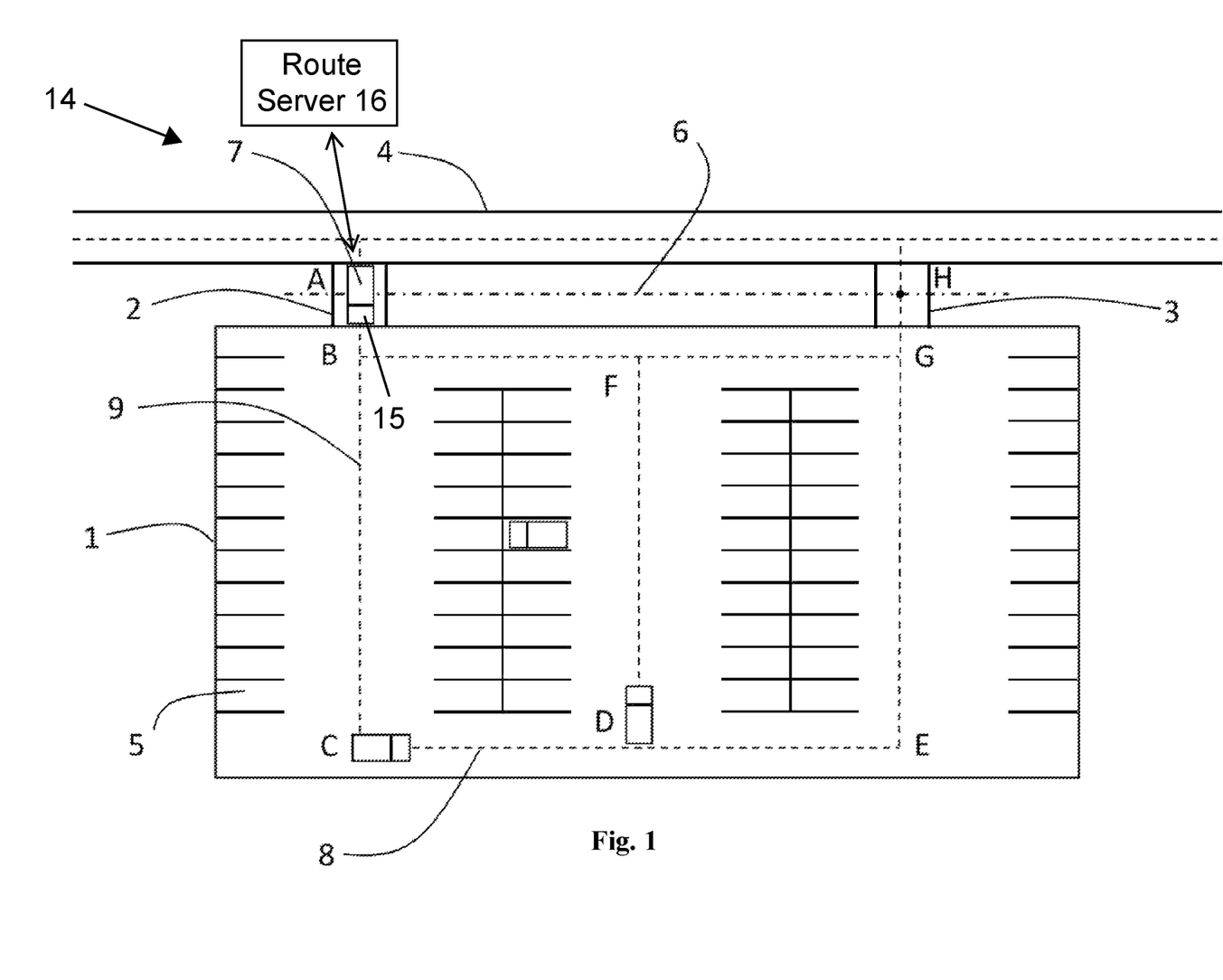
FIG. 1 schematically shows a parking area with multiple exits/entries.

FIG. 1 schematically shows a parking area 1 with multiple exit positions/entry positions. The parking area 1 comprises a first entry position 2 and a first exit position 3 in connection to a road 4. The parking area 1 comprises a number of parking spaces 5. The road 4 is considered a non-parking area and is thereby recognized as an area different from the parking area 1. A dash-dot line indicates a transition line 6 between the parking area 1 and the non-parking area, i.e. the road 4.

In the parking area 1, a number of route positions A, B, C, D, E, F, G, H are shown, where A indicates the first entry position 2 at a transition point between the parking area 1 and the non-parking area 1 and H indicates the first exit position 3 at a transition point between the parking area 1 and the non-parking area. The route positions will be used to specify parking area routes. For instance A-B-F indicates a parking area route that starts at route position A, proceeds to route position B and ends at route position F. Further route positions can be present between each route position in FIG. 1 to further enhance the level of detail of the parking area routes.

The route positions A, B, C, D, E, F, G, H are also intended to illustrate possible start and end positions of server routes within the parking area 1 that a navigation system can provide to a vehicle's navigation system. From FIG. 1, it can be seen that the server route inside the parking area 1 is connected to a server route on the road 4 outside the parking area 1 by the first entry position 2 and first exit position 3. The first entry position 2 and first exit position 3 may correspond to an existing server route exit position and an existing server route entry position in the route server. The first entry position 2 may also be an exit position and vice versa.

As an illustration of a route updating system 14, a vehicle 7 drives along the road 4 and the driver decides to enter the parking area 1 at the first entry position 2. When the vehicle 7 enters the parking area 1, a registration unit 15 arranged in the vehicle 7 starts to register a parking area route 8 of the vehicle 7 within the parking area 1. A route server 16, comprising a number of server routes within the parking area 1, is in communication with the registration unit. The route server is arranged to update the server routes within the parking area 1 upon receipt of the registered parking area route 8 from the vehicle's 7 registration unit. The vehicle 7 proceeds to drive to route position C, where it turns left towards route point D. At route point D, the vehicle 7 turns left towards route point F. Approximately halfway between route point D and F, the vehicle 7 parks in a parking space 5. The registration unit has registered the parking area route 8 A-B-C-D and halfway between D and F. As will be shown later, the parking area route 8 comprises a number of parking area route parts 9 A-C, C-D and D-halfway to F. When the vehicle 7 exits the parking area, for instance via the parking area route 8 F-G-H, the registration unit has registered that parking area route 8 and parking area route parts 9 halfway from D-F, F-G, G-H.

The geographical extension of the parking area 1 is made by means of data collected from a geographic information system (GIS), or by a triangulation method. In the triangulation method, the registration unit of vehicles using the parking area 1 registers parking positions. Three parking positions create a triangle and the largest triangles spans the parking area 1. The triangulation method allows for a dynamic construction of the parking area 1. If a parking area route 8 exceeds the parking area 1 as spanned by the triangulation, the parking area 1 will also include the parking area route 8.

Figure 2:
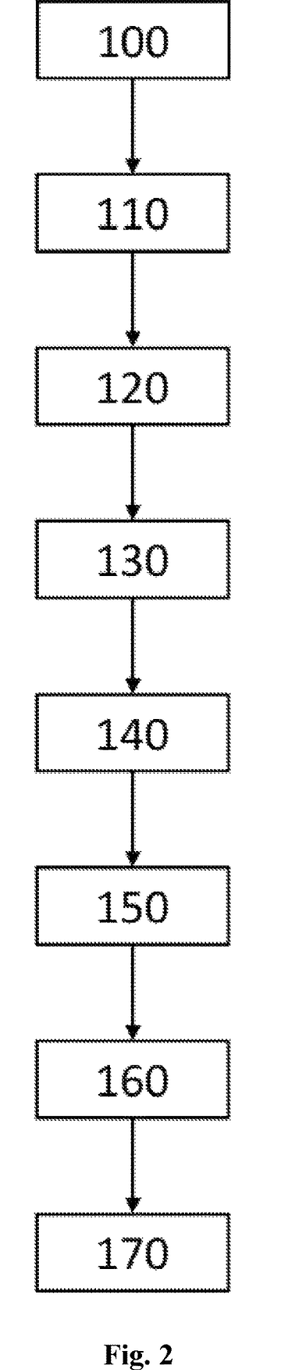

Updating a server route within the parking area 1 may take place according to the flowchart of FIG. 2. The routes described in the process are intended as illustration only.

In a first step 100, a vehicle 7 travels on the road 4 and decides to enter the parking area 1. The vehicle 7 comprises a registration unit that registers at least a position, a speed and a travel direction of the vehicle (i.e. if the vehicle 7 drives forward or reverse). Registration units capable of registering the above-mentioned data are known in the art.

In a second step 110, at route position A in FIG. 1, the vehicle 7 turns towards the first entry position 2 and enters the parking area 1 through the first entry position 2 at route position A.

In a third step 120, the registration unit starts the registration of the parking area route 8. During the entire time in the parking area 1, the registration unit is registering the parking area route 8. The parking area route 8 comprises at least one parking area route part 9, for instance the parking area route part 9 A-B or B-C. A parking area route part 9 can also be a subsection of the route part B-C as even more route positions can be added between the route positions B-C. Each parking area route part 9 comprises at least three consecutive parking area route points, where each parking area route point corresponds to one data sample of the registration unit. Each data point comprises at least the position, speed and travel direction of the vehicle 7.

In case updating exit positions and/or entry positions of the parking area 1 are of interest, this is recorded by the registration unit in the third step 120. An exit position/entry position is registered when the vehicle 7 transitions from the non-parking area to the parking area 1 as described in conjunction with FIG. 1. The non-parking area and parking area 1 are known in the registration unit and the transition points between the parking area 1 and the non-parking area are thus also known.

In a fourth step 130, the registered parking area route 8 is uploaded to the route server by the registration unit and the parking area route 8 is assigned an initial time weight value by the route server. The initial time weight value is a value that indicates how much weight a single registration of that particular parking area route 8 should be given when the server route is updated.

The vehicle 7 may enter a parking space 5 anywhere along the parking area route 8. A too large deviation from the travel direction will end the registration of the parking area route 8. This will be described in more detail below.

In a fifth step 140, the registered parking area route 8 is compared with existing server routes to find one server route part that corresponds to at least one parking area route part 9. In case no corresponding server route part exists, the route server will keep the parking area route part 9 as a new server route to be updated by later registered parking area routes 8 that correspond to the new server route.

In a sixth step 150, when a corresponding server route part is found, the corresponding server route part is updated by applying regression analysis of a distance between each of the parking area route parts 9 and the corresponding server route parts to provide an updated server route.

In a seventh step 160, a server route time weight value of the updated server route is updated by performing a mathematical operation with a previous server route time weight value and the initial time weight value of the registered parking area route 8. In this way, the server route time weight value will reflect that a vehicle 7 has recently travelled along a parking area route 8 that corresponds to the server route. For instance, the server route time weight value of the updated server route may be updated by multiplying or dividing a previous server route time weight value with the initial time weight value of the registered parking area route 8. As a non-limiting example, multiplication may be used if the initial time weight value is a positive number larger than or equal to 1. As a non-limiting example, division may be used if the initial time weight value is a positive number smaller than 1. Alternatively, the server route time weight value of the updated server route may be updated by adding or subtracting a previous server route time weight value with the initial time weight value of the registered parking area route 8. As a non-limiting example, addition may be used if the initial time weight value is a positive number. As a non-limiting example, subtraction may be used if the initial time weight value is a negative number.

In an eighth step 170, the route server provides the updated server route to a navigation server if the updated server route time weight value exceeds a threshold time weight value. The threshold time weight value is dependent on the number of vehicles expected to register a parking area route 8 over a certain period of time and/or the geographical extension of the parking area 1 and upload the registered parking area route 8 to the route server. A larger parking area 1 that normally experiences much traffic, such as a parking area outside a shopping centre, will have a higher threshold time weight value than a small parking area 1 with not as much traffic, such as a parking area in front of a sports arena that may only see traffic during specific days.

Figure 3:
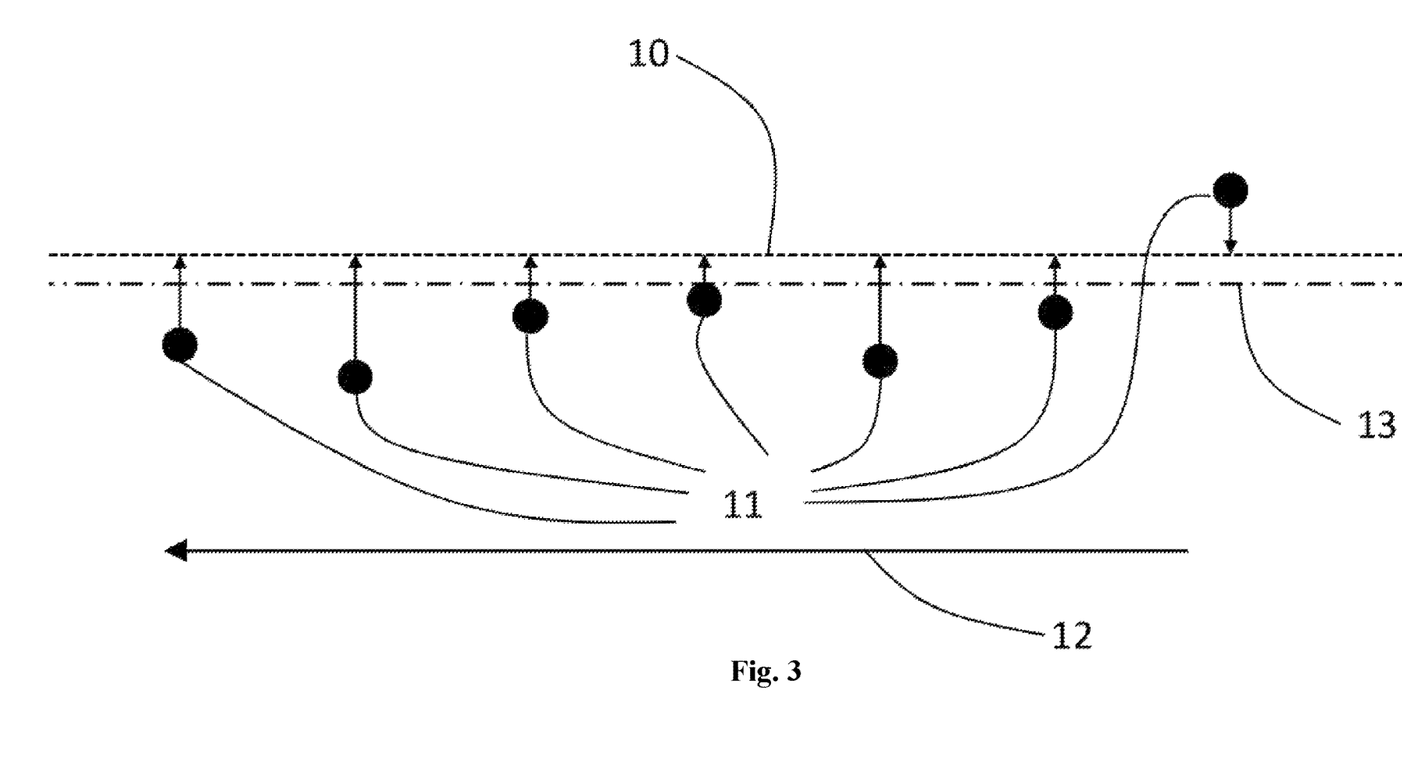

FIG. 3 schematically shows updating an existing server route part 10 with the registered parking area route points 11 of a registered parking area route part 9. The existing server route part 10 is indicated by a dashed line. An average vehicle travel direction 12 for which the parking area route points 11 are registered is indicated by an arrow. Distances between each registered parking area route points 11 and the server route part 10 are measured orthogonally to the server route part 10 relative to the travel direction 12. Regression analysis of the distances between each registered parking area route point 11 and the existing server route 10 is performed to update the existing server route part 10 to an updated server route part 13. How much the position of the existing server route part 13 will move is based on the distance between the registered parking area route points 11 and the existing server route. The existing server route part 13 is indicated by a dash-dot line. The distance between the existing server route part 10 and the existing server route part 13 is intended as illustration only. In case no existing server route part 10 exists in the route server, an initial server route part is created by performing a regression analysis of the registered parking area route points only. The direction of the average vehicle travel direction 12 is merely an example to illustrate the principle of the updating an existing server route part 10.

Figure 4:
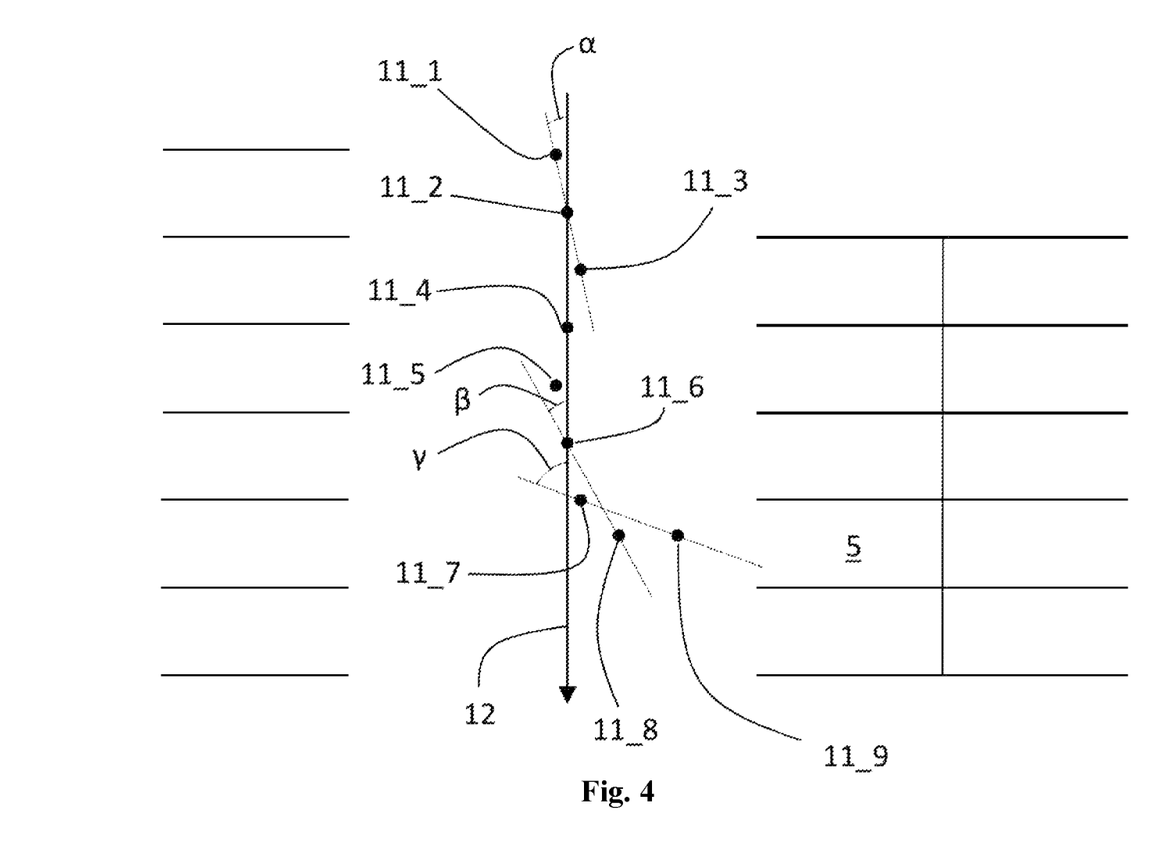

FIG. 4 schematically shows the creation of a registered parking area route part 9. In FIG. 4, the average vehicle travel direction 12 is indicated by an arrow. A number of registered parking area route points 11 have been registered as the vehicle 7 has travelled a distance within the parking area 1. Registered parking area route points 11_8, 11_9 indicate that the vehicle 7 has turned to park inside a parking space 5.

A parking area route part 9 is constructed of at least three consecutive parking area route points 11 where the difference in travel direction of at least three consecutive parking area route points lie within a travel direction angle threshold. For parking area route points 11_1, 11_2, 11_3, a first travel direction angle α relative the general travel direction is indicated. The first travel direction angle α lie within the travel direction angle threshold and a parking area route part 9 is registered. Further, the travel direction angle of parking area route points 11_2, 11_3, 11_4 also lie within the travel direction angle threshold and the parking area route point 11_4 is added to the parking area route part 9. This also applies to parking area route points 11_5, 11_6 and 11_7. For parking area route points 11_6, 11_7, 11_8, a second travel direction angle β relative the general travel direction 12 is indicated. 13 is larger than a and depending on the travel direction angle threshold, parking area route point 11_8 can be added to the parking area route part 9. For parking area route points 11_7, 11_8, 11_9, a third travel direction angle γ relative the general travel direction is indicated. γ is larger than both β and α and lie outside of the travel direction angle threshold. Parking area route point 11_9 is thereby not added to the parking area route part 9.

If only parking area route points 11 having one travel direction 12 are registered, the route server will list the specific updated server route corresponding to the parking area route being constructed from those specific parking area route parts 9 as being a one-way route. This will ensure that no incorrect navigation routes will be provided as options to a driver.

Figure 5:
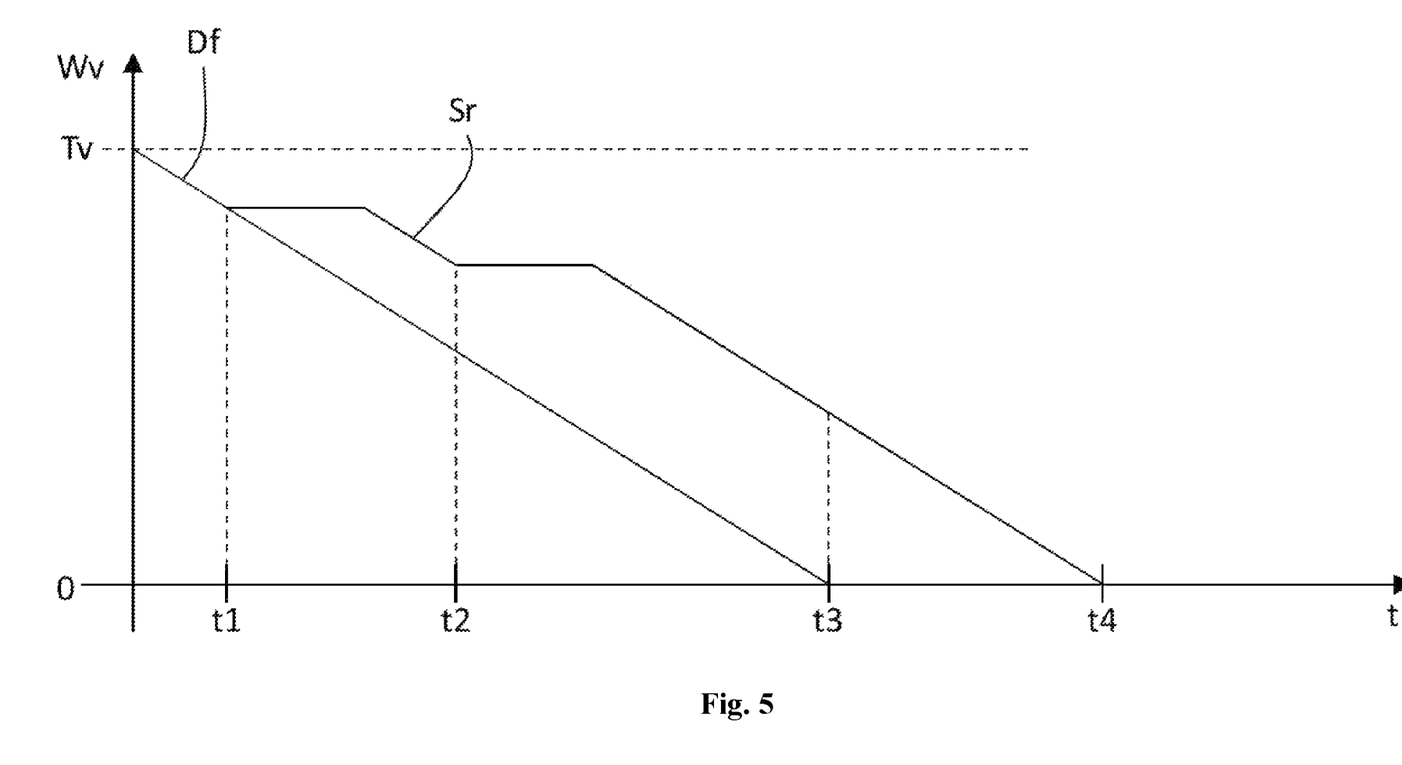
FIG. 5 schematically shows a chart over a server route time weight value and a decay function time weight value.

FIG. 5 schematically shows a chart over a server route time weight value and a decay function time weight value with respect to time. In the chart, a graph over the decay function time weight value Df and the server route time weight value Sr is shown. Also in the chart is a threshold time weight value Tv. If the server route time weight value exceeds the threshold time weight value, an updated server route is added to the route server. The axes illustrate weight value Wv and time t.

As a way to ensure that a server route and/or a server route exit position and/or a server route entry position is removed from the route server if it is not used for some predetermined period of time, a decay time function is assigned to the server route. The initial decay function time weight value is the same as the updated server route time weight value. The decay function time weight value is reduced by a constant reduction rate corresponding to an expected reduction rate of the server route time weight value based on the time passed since last update of the server route. This constant reduction rate is based on that no vehicles provide updates to the server route, i.e. that no vehicles register a parking area route 8 corresponding to that server route. In FIG. 5, time=0 is chosen such that the value of both the server route time weight value and a decay function time weight value is equal to the threshold time weight value. This is for illustrative purpose only.

The server route time weight value is reduced according to a reduction function in the route server, where the reduction function reduces the server route time weight value based on the time passed since last update of the server route. However, as can be seen at times t1 and t2, the server route time weight value remains constant for some time. This indicates that a vehicle has provided an update of the server route. But, as the server route time weight value does not reach the threshold time weight value, the updated server route is not added to the navigation server. After a further period of time, the server route time weight value is reduced according to the reduction function until time t2 when a vehicle again has provided an update of the server route. But, as the server route time weight value does not reach the threshold time weight value, the updated server route is not added to the navigation server.

The difference in reduction between the server route time weight value and the decay function time weight value enables that a server route can be kept in the route server as long as there are vehicles providing intermittent updates to the server route. This is an indication that the server route is active, but not active enough such that the updated server route is added to the navigation server. This means that the decay function time weight value can reach zero, as it does at time t3, without the server route time weight value reaches zero. Only if both the server route time weight value and the decay function time weight value reaches zero, as is shown at time t4, is the server route removed from the route server and thereby will not be available to the navigation server.

As indicated above, the same procedure as for the server route takes place for a server route exit position and/or a server route entry position. The procedure can also be applied to specific server route parts.

Although the disclosure has been illustrated and described in detail in the drawings and foregoing description, such illustration and description are to be considered illustrative or exemplary and the disclosure is not limited to the disclosed embodiments.

What is claimed is:

1. A method for updating a server route within a parking area with a route updating system, wherein the route updating system comprises: a registration unit arranged in a vehicle and being arranged to register a parking area route of the vehicle within the parking area, and a route server comprising a number of server routes within the parking area, wherein each server route comprise at least one server route part, and being arranged to update the server routes within the parking area, wherein the method comprises:
   registering a parking area route by the registration unit, wherein the parking area route comprises at least one parking area route part,
   uploading the registered parking area route to the route server by the registration unit,
   assigning an initial time weight value to the registered parking area route by the route server,
   comparing the registered parking area route with server routes to find one existing server route part that corresponds to a registered parking area route part,
   updating the corresponding existing server route part by applying regression analysis of a distance between each of the parking area route parts and the corresponding existing server route parts to provide an updated server route part of an updated server route,
   updating a server route time weight value of the updated server route by performing a mathematical operation with a previous server route time weight value and the initial time weight value of the registered parking area route,
   providing the updated server route to a navigation server if the updated server route time weight value exceeds a threshold time weight value.

2. The method according to claim 1, wherein the method comprises:
   determining, by the registration unit, if the registered parking area route comprises an exit position from the parking area,
   comparing the registered exit position with a server route exit position in the route server to find a server route exit position that corresponds to the registered exit position,
   updating the corresponding server route exit position by applying regression analysis of a distance between the registered exit position of the parking area route and the corresponding server route exit position to provide an updated exit position,
   updating a server exit time weight value of the updated server route exit position by performing a mathematical operation with the server exit time weight value and the initial time weight value of the registered parking area route,
   providing the updated server route exit position to a navigation server if the server exit time weight value exceeds a threshold time weight value.

3. The method according to claim 2, wherein the method comprises:
   connecting the updated server route inside the parking area with existing server routes outside the parking area by the updated server route exit positions and/or server route entry positions in the route server before providing the updated server route to the navigation server.

4. The method according to claim 1, wherein the method comprises:
   determining, by the registration unit, if the registered parking area route comprises an entry position to the parking area,
   comparing the registered entry position with a server route entry position in the route server to find a server route entry position that corresponds to the registered entry position,
   updating the corresponding server route entry position by applying regression analysis of a distance between the registered entry position of the parking area route and the corresponding server route entry position to provide an updated server route entry position,
   updating a server entry time weight value of the updated server route entry position by performing a mathematical operation with the server entry time weight value and the initial time weight value of the registered parking area route,
   providing the updated server route entry position to a navigation server if the server entry time weight value exceeds a threshold time weight value.

5. The method according to claim 1, wherein the method comprises:
   registering a plurality of parking area route points, wherein the at least one parking area route part comprises a subset of the plurality of parking area route points,
   registering a travel direction of the vehicle by the registration unit in the vehicle for each parking area route point,
   wherein one parking area route part is created only if the difference in travel direction of at least three consecutive parking area route points lie within a travel direction angle threshold.

6. The method according to claim 1, wherein the method comprises:
   assigning a decay function time weight value to the server route, where the decay function time weight value corresponds to an expected constant reduction rate of the server route time weight value based on the time passed since last update of the server route,
   reducing the server route time weight value according to a reduction function in the route server, where the reduction function reduces the server route time weight value based on the time passed since last update of the server route,
   comparing the decay function time weight value with the server route time weight value,
   keeping the server route in the route server for a predetermined time if the decay function time weight value is equal to zero and the server route time weight value is greater than zero, and
   removing the server route from the route server if the decay function time weight value equals zero and the server route time weight value equals zero.

7. The method according to claim 1, wherein the method comprises:
   determining the extension of the parking area by means of a geographic information system (GIS), or by a triangulation method.

8. The method according to claim 1, wherein the method comprises:
    determining if the parking area comprises one-way routes based on the travel direction of each registered parking area route used to update the server route.

9. A non-transitory computer readable medium storing a computer program configured to, when executed, cause execution of the method according to claim 1.

10. A route updating system for updating a server route within a parking area, wherein the system comprises a registration unit arranged in a vehicle being arranged to register a parking area route of the vehicle within the parking area, and a route server comprising a number of server routes within the parking area and being arranged to update the server routes, wherein each server route comprise at least one server route part, wherein the registration unit is configured to register a parking area route, wherein the parking area route comprises at least one parking area route part, and further being arranged to upload the registered parking area route to the route server, wherein the route server is configured to assign a initial time weight value to the registered parking area route by the route server, compare the registered parking area route with the server routes to find one existing server route part that corresponds to at least a registered parking area route part, update the corresponding existing server route part by applying regression analysis of a distance between each of the parking area route parts and the existing server route parts to provide an updated server route part of an updated server route, update a server route time weight value of the updated server route by performing a mathematical operation with the server route time weight value and the initial time weight value of the registered parking area route, provide the updated server route to a navigation server if the server route time weight value exceeds a threshold time weight value.

11. The route updating system according to claim 10, wherein the registration unit is further configured to determine if the registered parking area route comprises an exit position from the parking area, and the server is further configured to compare the registered exit position with server exit positions in the server to find one server exit position that corresponds to the registered exit position, update a server exit time weight value of the updated exit position by performing a mathematical operation with the server route time weight value and the initial time weight value of the registered parking area route and provide the updated server exit position to a navigation server if the server exit time weight value exceeds a threshold time weight value.

12. The route updating system according to claim 10, wherein the registration unit is further configured to determine if the registered parking area route comprises an entry position to the parking area, and the server is further configured to compare the registered entry position with server entry positions in the server to find one server entry position that corresponds to the registered entry position, update a server entry time weight value of the updated server entry position by performing a mathematical operation with the server route time weight value and the initial time weight value of the registered parking area route and provide the updated server entry position to a navigation server if the server entry time weight value exceeds a threshold time weight value.

13. The route updating system according to claim 10, wherein the registration unit is further configured to register parking area route points, wherein the at least one parking area route part comprises a subset of the plurality of parking area route points, and to register a travel direction of the vehicle for each parking area route point, wherein the parking area route part is created if the difference in travel direction of at least three consecutive parking area route points lie within a travel direction angle threshold.

14. The route updating system according to claim 10, wherein the server is further configured to assign a decay function time weight value to the server route, where the decay function time weight value corresponds to an expected reduction in server route time weight value based on the time passed since the last update of the server route, reduce the server route time weight value according to a reduction function, where the reduction function reduces the server route time weight value based on the time passed since the last update of the server route, compare the decay function time weight value with the server route time weight value, keep the server route in the server for a predetermined time if the decay function time weight value is equal to zero and the server route time weight value is greater than zero, and remove the server route from the server if the decay function time weight value equals zero and the server route time weight value equals zero.

15. The route updating system according to claim 10, wherein the server is further configured to connect the updated server route inside the parking area with existing server routes outside the parking area by the updated server exit positions and/or entry positions in the server before providing the updated server route to the navigation system.

* * * * *